Sept. 8, 1953   R. P. LOEWEN ET AL   2,651,569
METHOD FOR THE PRODUCTION OF ALLOYS
Filed March 23, 1951
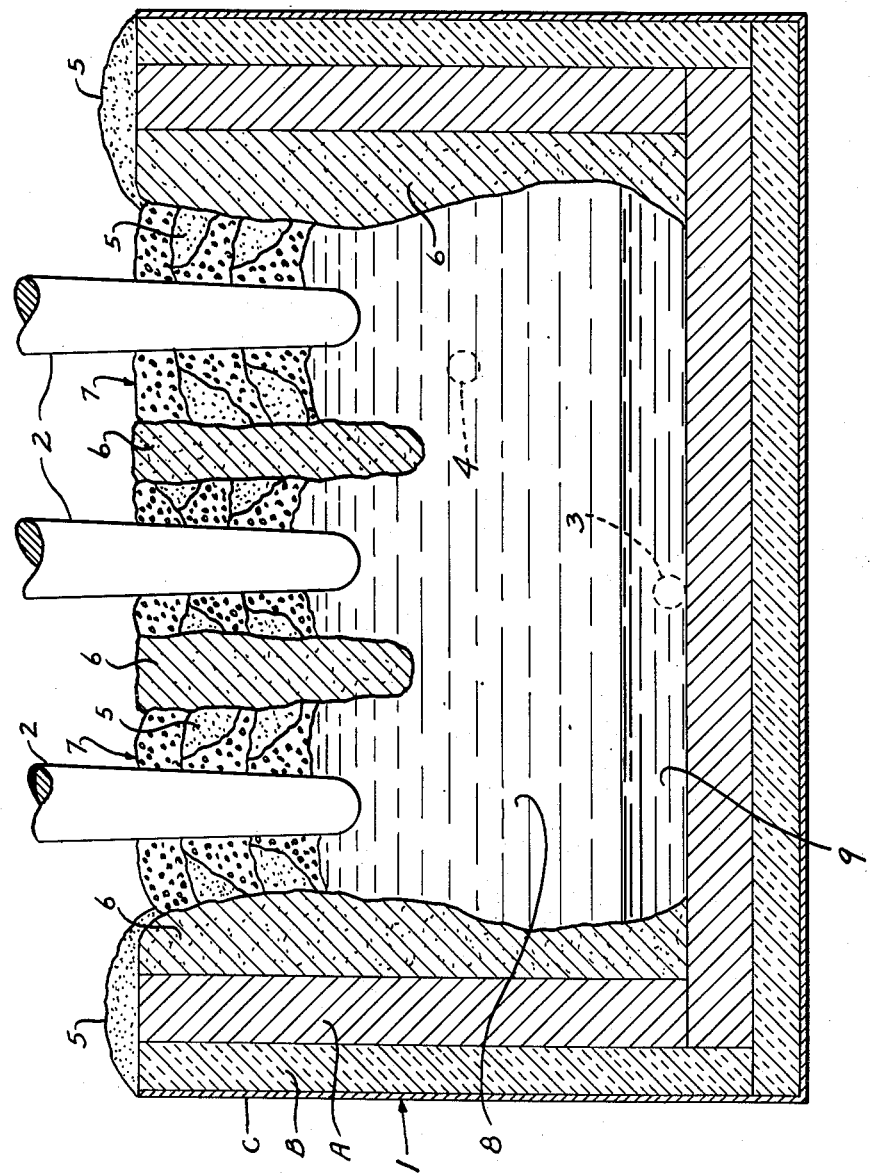
INVENTORS.
ROLAND P. LOEWEN
BY JOHN H. STARR
Elmer P. Rucker
ATTORNEY Patented Sept. 8, 1953

2,651,569

UNITED STATES PATENT OFFICE 2,651,569

METHOD FOR THE PRODUCTION OF ALLOYS

Roland P. Loewen and John H. Starr, Anniston, Ala., assignors to Monsanto Chemical Company, St. Louis, Mo., a corporation of Delaware Application March 23, 1951, Serial No. 217,154

12 Claims. (Cl. 75—10)

The present invention relates to metallic silicides, particularly ferrosilicon, and to a novel and commercially practical method of producing same.

Heretofore, it has been the practice to produce ferro-silicon by charging a preformed mixture of coke, iron and silica rock to an electric furnace and then establishing an electric arc within the charge to combine substantially all of the silicon with the iron, either chemically or as an alloy. However, this method has a number of disadvantages which render it commercially unattractive.

For example, when following the above method, the silicon produced by the reduction of the silica rock escapes from the furnace at such a rapid rate that much of it is lost before it has an opportunity to combine with the iron content of the charge and, therefore, the silica practice is poor. Consequently, it is essential to employ a large excess of this material in order to ensure the production of ferrosilicon of the desired silicon content.

Moreover, the silica rock melts into sticky gummy crusts that adhere to the electrodes and to the cold stock 5 to 10 inches away from the electrodes. These crusts prevent the free flow of fresh stock into the smelting zone and interfere with the exit of the product gases from the furnaces. It is, therefore, necessary to remove the above crusts and this is a difficult, laborious and time-consuming operation since the crusts are quite tough and the working area is very hot.

In addition, the above irregularities in furnace operation have the detrimental effect of impairing the uniformity of the ferrosilicon product and of substantially reducing its rate of production.

Finally, all of the foregoing irregularities and disadvantages add up to excessive labor and power costs.

The present invention has at its primary object the provision of a novel method of charging and operating electric furnaces whereby the above difficulties and disadvantages in the manufacture of ferro-silicon are either eliminated completely or reduced to a minimum.

Another object of the invention is to provide a method of charging and operating a ferrosilicon furnace, which results in substantially improved silica practice.

An additional object of the invention is to provide a method of charging and operating a ferrosilicon furnace, which results in a substantial savings in labor and power costs over those employed by the prior art.

A further object is to provide a method of charging and operating a ferrosilicon furnace whereby substantially improved production rates are obtained over those of the prior art.

Other objects and advantages will be apparent to those skilled in the art as the description of the present invention proceeds.

We have developed a novel method of charging and operating an electric furnace whereby the above-mentioned disadvantages and difficulties encountered in previous methods of producing ferrosilicon are either overcome or reduced to a minimum. In accordance therewith, a preformed mixture of iron and carbon, and silica rock are separately and successively introduced around the electrodes of an electric furnace in such a manner that the preformed mixture is so disposed with respect to the silica rock as to provide a barrier between the latter and the electrodes. As a modification of this method of charging, the mixture of iron and carbon is introduced continually around the electrodes and at the same time the silica rock is charged continually around the mixture. The furnace charge is then heated by establishing an electric arc therein to produce ferrosilicon which is tapped out of the furnace in the customary manner. There is also produced a gaseous product including carbon monoxide which passes up through the furnace to be exhausted to the atmosphere or recovered for use as fuel or in various chemical processes.

For a more complete understanding of the instant invention, reference is made to the accompanying drawing forming a part of the instant specification, in which the single figure illustrates a vertical sectional view of a suitable electric furnace for carrying out the above method.

In the figure, reference character 1 represents the furnace wall including a carbon lining A, insulating brick B and a metal shell C; 2 the electrodes; and 3 and 4 the tap holes for ferrosilicon and slag, respectively.

Reference character 5 indicates a supply of silica rock which is located at the outer edges of the furnace on top of the carbon lining and over the dead stock zone 6. This dead stock zone is in the form of a fairly hard and substantially stationary silica crust which is spaced about 5 to 10 inches from the electrodes. The zone 7 immediately surrounding the electrodes is the feeder area which contains alternate layers of silica rock and a preformed mixture of iron turnings and coke breeze as illustrated in the drawing. In this zone the stock is loose and is constantly slipping down into the lower regions of the furnace. This loose or active stock flows by gravity into smelting zone 8 where it is converted into ferrosilicon and a gaseous product containing carbon monoxide in accordance with the following equation:

$$Fe_x + SiO_2 + 2C \rightarrow FeSi_x + 2CO$$

The ferrosilicon thus obtained collects in the form of a molten bath 9 at the bottom of the furnace and is eventually withdrawn from the furnace through tap hole 3. If the stock contains impurities, the resulting slag is removed from the furnace via tap hole 4.

The width of zone 7 varies inversely with the width of the dead stock zone and the width of each is dependent upon the power supplied to the electrodes. As indicated above, in actual practice the zone 7 has a width of about 5 to 10 inches.

The following example illustrates a method of carrying out the present invention, but it is to be understood that this example is given by way of illustration and not of limitation.

Example

A large quantity of silica rock is placed at various points around the top of the furnace as indicated in the drawing. Then, approximately 230 lbs. of coke breeze and 210 lbs. of iron turnings are thoroughly mixed together and a portion of this mixture is charged around the electrodes. This is followed by charging some of the above silica rock on top of the mixture, every effort being made to keep the former as far away from the electrodes as possible. The above charging operations are repeated so as to build up a laminated column of feed stock around the electrodes, the last lamination being a mixture of coke and iron turnings.

The above charge is smelted by establishing an electric arc therein and thereby converting same to ferrosilicon which is tapped from the furnace and a gaseous product containing carbon monoxide which passes up through the feeder zone to preheat the incoming stock. As the smelting proceeds, the stock around the electrodes sinks in to form a depressed annular space and into this space silica rock and the above coke-iron mixture are alternately charged to continuously build up a laminated column as above described, the silica rock being supplied from the dead stock zone and being replaced by the rock from the top edge of the furnace. In performing the above charging operations, particular attention is paid to the position of the electrodes. If the electrodes move to a relatively low position in the stock, a heavy charge of the coke-iron mixture is introduced into the furnace, thus causing the electrodes to rise. On the other hand, if the electrodes move to a relatively high position, an excess of silica rock is charged so that the electrodes go deeper into the furnace. This control is valuable in the operation of the furnace.

It is essential to keep the silica rock buried at the charging point as if the rock is near the surface it soon reaches the semi-molten state, but the cooling effect of the atmosphere does not allow it to become sufficiently molten to run down into the furnace properly. Moreover, the semi-molten material sticks to the electrodes and the dead stock and very effectively obstructs the charging of new stock. By keeping the silica rock well buried, the silica rock is heated to such a fluid condition that it readily flows down into the furnace and does not adhere to the dead stock. Also, by following the technique of providing a barrier for the silica by charging the coke-iron mixture in direct contact with the electrodes, the sticking of the molten silica rock to the electrodes is effectively prevented.

The above described method yields 50% grade ferrosilicon in which approximately 1.15 lbs. of silica rock, 0.52 lb. of iron turnings and 0.56 lb. of coke breeze are used for each pound of ferrosilicon produced. However, it is obvious that by suitably proportioning the above raw materials, the method may be used to produce ferrosilicon of any desired silicon content.

The composition of the ferrosilicon is controlled by adjusting the ratio of the coke to iron and by the purity of these materials. For example by smelting 230 lbs. of coke, 210 lbs. of iron turnings and silica rock in at least the proportion required to convert the coke into carbon monoxide, a ferrosilicon containing about 50% by weight of silicon is produced. Moreover, by raising the weight ratio of coke to iron and carrying out the above operation, the silicon content of the ferrosilicon is increased and by lowering the above ratio, the silicon content is varied in the opposite direction. From the foregoing, it is evident that so long as a sufficient amount of silica is used to convert the coke into carbon monoxide, it is only necessary to adjust the carbon to iron ratio in order to produce whatever grade of ferrosilicon is desired. However, in making the above adjustment, it is evident that due consideration must be given to the source of the iron as if mill scale or iron ore is used, additional carbon must be added in order to reduce the iron compound to the metallic state.

With regard to the raw materials, other forms of iron, carbon and silica may be used with satisfactory results. For example, coal, charcoal, carbon black, lampblack, and other carbonaceous reducing agents may be substituted for coke breeze; steel, mill scale and iron ore for iron turnings; and silica sand, quartz, cristobalite, lechatelerite, tridymite and other silica containing minerals for silica rock.

The method of the instant invention is executed in a semi-continuous or batchwise manner, but if desired, it may be carried out continuously. When carried out in the latter manner, a suitable water-cooled baffle or cylinder is provided around the electrode so that the mixture of iron and coke can be continuously supplied around the electrodes and the silica rock around the coke-iron mixture. Thus, the furnace is continuously supplied with a vertically laminated charge in which the coke-iron mixture serves as a barrier between the silica rock and the electrodes.

The furnace charge is continuously smelted to form ferrosilicon which is continuously tapped from the furnace and as the latter operation takes place, equivalent amounts of raw materials are continuously introduced into the furnace to take the place of the consumed iron, coke and silica rock.

Although the foregoing description has been restricted to ferrosilicon, the above method is generally applicable to non-metals, metals and alloys that can be produced in the electric furnace by the use of carbon or an equivalent reducing agent. As illustrative examples of additional products that can be produced by the above method may be mentioned metal silicides such as nickel silicide, cobalt silicide, chromium silicide, manganese silicide, copper silicide, and magnesium silicide; ferro alloys such as ferromanganese, ferrophosphorus, ferrotitanium, ferrotungsten, ferromolybdenum, ferroboron, ferrovanadium and ferrozirconium; non-metals such as silicon, phosphorus, etc.; and metals such as iron, nickel, cobalt, chromium, manganese, copper, magnesium, titanium, tungsten, molybenum, boron, vanadium and zirconium.

In the production of metallic silicides, the raw materials are preferably charged in the manner described in connection with ferrosilicon, but, if desired, the carbon reducing agent and the preformed mixture of silica and metal or metal ore may be separately and successively introduced around the electrodes in such a manner that the above reducing agent is so situated with respect to the above mixture as to provide a barrier between the latter and the electrodes. In this modification, the dead stock zone would include a mixture of silica and metal or metal ore and the active or loose stock zone would include alternate layers of carbon and a mixture of silica and metal or metal ore.

In the continuous production of metallic silicides by the above modification, the carbon reducing agent is charged continuously around the electrodes and the mixture of silica and metal or metal ore around the reducing agent. In this manner, the furnace is continuously supplied with a vertically laminated charge in which the reducing agent serves as a barrier between the silica-containing mixture and the electrodes.

The same principle of operation is utilized in preparing non-metals, metals or metal alloys other than ferrosilicon. Thus, in producing metals and non-metals, the carbon reducing agent is charged around the electrodes and the metallic or non-metallic ore around the reducing agent. In making an alloy, the carbon and metal or metal ore are premixed and charged around the electrode and a metal or metallic or non-metallic ore around the mixture. If desired, the alloy may also be produced by charging only carbon around the electrodes and a single ore, a mixture of ores or a mixture of metal and metallic or non-metallic ore around the carbon reducing agent.

In view of the foregoing, it is evident that the instant invention in its broadest aspect contemplates a method of producing metals, non-metals and metal alloys by electrothermal reduction with carbon or equivalent reducing agent, in which the latter serves as a protective barrier between the electrodes and the remainder of the charge. Therefore, it is obvious that the method of charging is susceptible to considerable variation without departing from the spirit of the invention and also that the only limitation in this respect is that the charging should be executed in such a manner as to avoid mixing with the reducing agent, silica or other materials which tend to excessively corrode (or stick to) the electrodes.

Where the expression metal containing material occurs in the claims, it has reference to iron, copper, nickel, cobalt, chromium, magnesium, manganese, tungsten, titanium, molybenum, boron, vanadium and zirconium, and also compounds and ores containing same. In this connection, it should be stated that the selection of the metal-containing material is dependent upon the alloying material hereinafter referred to as, if the latter is a metal or non-metal in the elemental condition, it is obvious that the metal-containing material must be an ore or composition containing same, otherwise the carbon reducing agent would have no function to perform.

Also, where the expression alloying material is employed in the claims, it is to be understood that it refers to non-metals such as phosphorus and silicon, metals, ores or compounds containing same, which include one or more elements capable of forming alloys with the above listed metals. More particularly, it refers to materials containing as the active alloying constituent an element selected from the group consisting of silicon, phosphorus, manganese, chromium, molybdenum, titanium, tungsten, boron, vanadium and zirconium. It is, of course, implied from the expression alloying material that different metals and not the same metal from the above groups must be used in the production of alloys.

What we claim is:

1. The method of producing metallic silicides by electrothermal reduction, which comprises introducing a mixture of carbon and a metal-containing material around the electrodes of an electric furnace and silica around said mixture and smelting the resulting charge, said metal-containing material being selected from the group consisting of iron, copper, nickel, cobalt, chromium, magnesium, manganese, tungsten, titanium, molybdenum, boron, vanadium, zirconium, compounds and ores containing said metals.

2. The method of producing metallic silicides in accordance with claim 1, wherein the metal-containing material is metallic iron.

3. The method of producing metallic silicides in accordance with claim 1, wherein the metal-containing material is metallic nickel.

4. The method of producing metallic silicides in accordance with claim 1, wherein the metal-containing material is metallic cobalt.

5. The method of producing metallic silicides in accordance with claim 1, wherein the metal-containing material is metallic copper.

6. The method of producing metallic silicides in accordance with claim 1, wherein the metal-containing material is metallic magnesium.

7. The method of producing ferrosilicon by electrothermal reduction, which comprises introducing a mixture of coke breeze and iron turnings around the electrodes of an electric furnace and silica rock around said mixture, and smelting the resulting charge, said mixture being so disposed with respect to the silica rock as to provide a barrier between the latter and the electrodes.

8. The method of producing ferrosilicon in accordance with claim 7, wherein the mixture of coke breeze and iron turnings, and silicon rock are introduced in such a manner as to provide a column of stock adjacent the electrodes which consists of alternate layers of said mixture and silica rock.

9. The method of producing ferrosilicon in accordance with claim 8, wherein said alternate layers are so arranged as to provide a top layer consisting of said mixture of coke breeze and iron turnings.

10. The method of producing ferrosilicon in accordance with claim 9, wherein the weight ratio of coke breeze to iron turnings is about 1.1:1.0 and wherein the silica is employed in an amount at least sufficient to convert said breeze to carbon monoxide.

11. The method of continuously producing ferrosilicon, which comprises continuously introducing a mixture of coke breeze and iron turnings around the electrodes of an electric furnace and silica rock around said mixture and continuously smelting the resulting charge.

12. The method of producing ferrosilicon by electrothermal reduction, which comprises introducing a mixture of carbon and an iron-containing material around the electrodes of an electric furnace and an alloying material containing silicon as the active constituent around said mixture and smelting the resulting charge, said iron-containing material and said alloying material being employed in such a manner that at least one of them is in the unreduced state while the other is in the reduced state.

ROLAND P. LOEWEN.
JOHN H. STARR.

References Cited in the file of this patent

UNITED STATES PATENTS

| Number | Name | Date |
|---|---|---|
| 790,391 | Price | May 23, 1905 |
| 1,873,800 | Wejnarth | Aug. 23, 1932 |